Feb. 26, 1963  H. L. BRUEMMER  3,078,888
DOVETAILING MACHINE AND METHOD
Filed Nov. 3, 1960  2 Sheets-Sheet 1
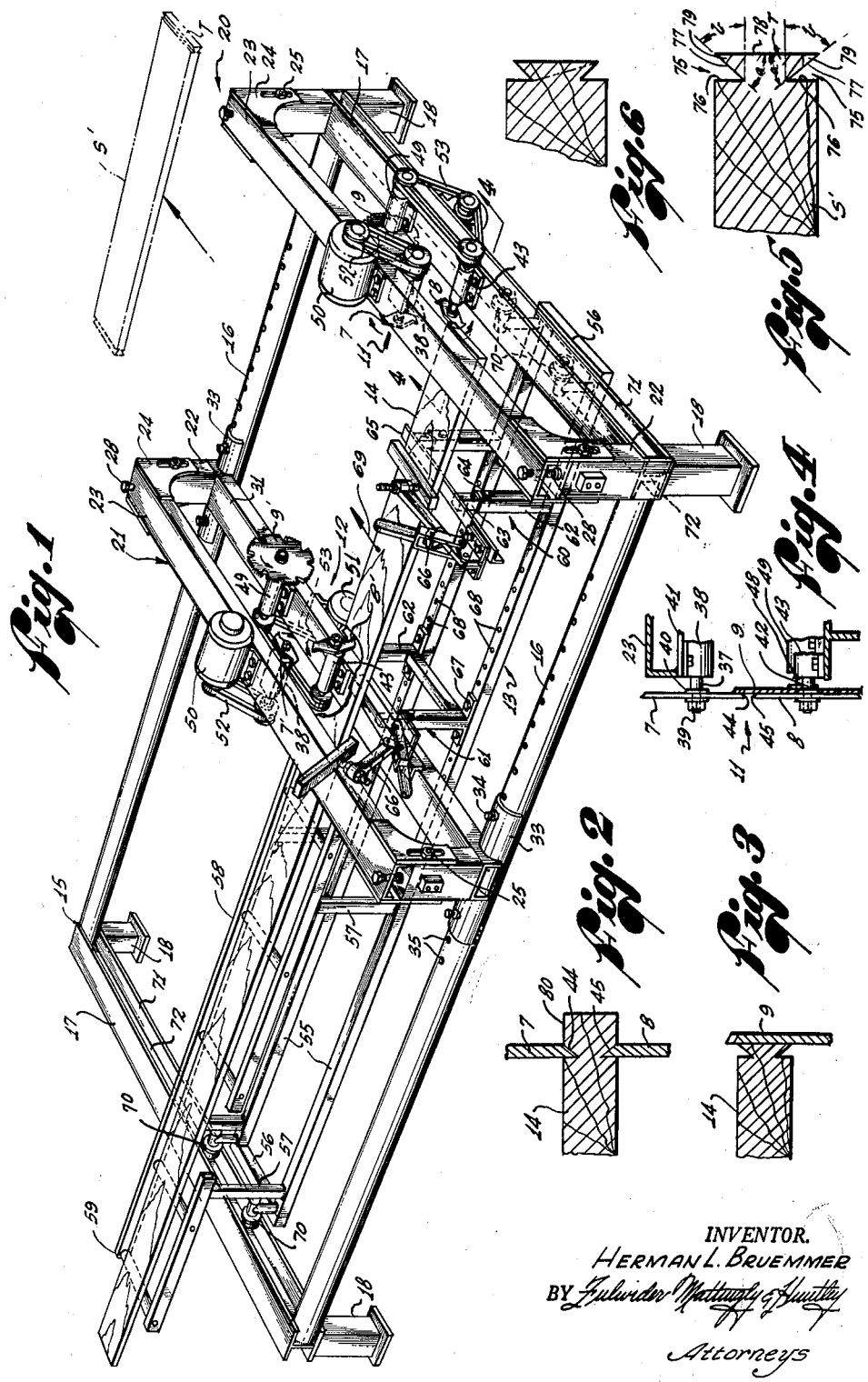
INVENTOR.
HERMAN L. BRUEMMER
BY
Attorneys Feb. 26, 1963   H. L. BRUEMMER   3,078,888
DOVETAILING MACHINE AND METHOD
Filed Nov. 3, 1960   2 Sheets-Sheet 2

INVENTOR.
HERMAN L. BRUEMMER
BY
Attorneys

United States Patent Office 3,078,888
Patented Feb. 26, 1963

3,078,888
DOVETAILING MACHINE AND METHOD
Herman L. Bruemmer, 1234 W. 163rd St., Gardena, Calif.
Filed Nov. 3, 1960, Ser. No. 67,098
5 Claims. (Cl. 144—326)

This invention relates to a machine for and a method of forming the tenons of mortise and tenon joints; and more particularly to such a machine and method which are especially well adapted to the formation of dovetail or half-dovetail tenons.

Therefore, by way of example, I will described my invention as applied to the formation of tenons of dovetail mortise and tenon joints, but this choice of example is not to be considered as limitative of the invention.

The many advantages of dovetail joints are well recognized, particularly in connection with shelving. But the problems incident to the formation of such joints on shelving are of natures which, heretofore, have severely limited the extent to which advantage has been taken of the superiority of dovetail joints.

One of the major problems encountered is in connection with the cutting of the dovetail tenon. It has been the usual practice to cut such a tenon by making passes with router bits on opposite faces of the work; the bits being so shaped and so located with respect to the work that the slanting walls of the tenons terminated at the free end of the work, thus leaving relatively sharp angular tips at the junctions of the slanting walls and the free end of the work.

This practice was completely unsatisfactory when cutting across the grain of the work, as is usually the case in cutting shelf-board tenons, for the bits chipped or broke away sections of the angular tips, giving a notched or ragged edge effect that was unacceptable. Accordingly, the practice of machine-dovetailing the ends of shelving was largely discontinued.

In situations where cuts could be made with the grain, attempts were made to reduce or avoid the chipping effect on the tips by increasing the tip angle, but increase in this angle spelled a complementary decrease in the slant angle of the tenon and a corresponding loss in the ability of the final joint to resist pull-apart forces.

It is therefore a primary object of this invention to provide a machine for and method of cutting satisfactory dovetail tenons either with or against the grain of the work, the tenons being free of chipped-out notches and other imperfections.

Another object is to provide a machine and method of the type described for cutting such dovetail tenons regardless of the slant angles of the tenons.

A further object is to provide a machine for and method of cutting dovetail tenons on the opposite ends of a board and for simultaneously sizing the board to a predetermined length.

A still further object of this invention is to provide a machine for and method of the type described for producing a high quality dovetail tenon, the machine and method being economical from the standpoint of labor costs by virtue of a high rate of production.

These and other objects of the invention will be better understood by referring to the following detailed description taken in conjunction with the accompanying drawings in which:

FIGURE 1 is a perspective view of the machine of the invention;

FIGURE 2 is a schematic view of a work piece during a first period of the dovetailing operation;

FIGURE 3 is a schematic view, similar to FIGURE 2, of the work piece during a subsequent period of the dovetailing operation;

FIGURE 4 is a partial section taken on the line 4—4 of FIGURE 1;

FIGURE 5 is a sectional view of a tenon formed by the machine of and in accordance with the method of the invention;

FIGURE 6 is a sectional view, similar to FIGURE 5, showing a slightly modified form of tenon;

Figure 7:
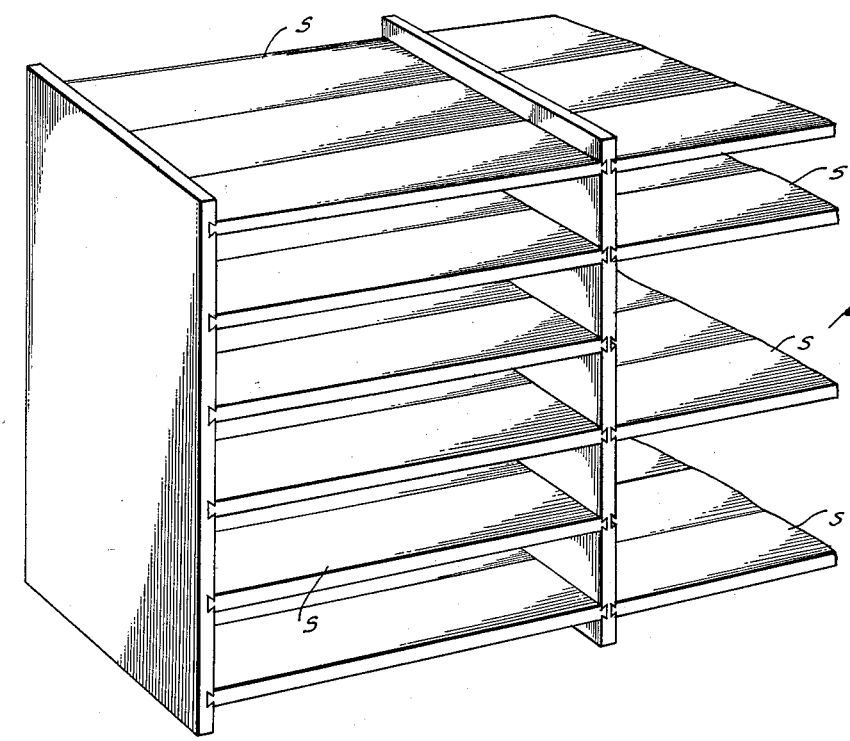
FIGURE 7 is a perspective view of structure embodying shelving with terminal dovetail tenons formed in accordance with the invention.

Referring to the drawings, and in particular to FIGURE 1, the machine of the invention includes generally a frame 10, mounting two similar cutter units 11 and 12, spaced apart longitudinally of the frame, and a carriage 13 for conveying a work piece 14, here represented as shelving stock, in rectilinear translation across the frame in the paths of said cutter units.

The units 11 and 12 being similar, I will describe only unit 11 in detail, corresponding parts of unit 12 being indicated by corresponding, primed numerals. Unit 11 includes a pair of upper and lower, vertically aligned rotary chippers 7 and 8, respectively; and a rotary saw 9. The particular natures of these elements and their locational association will be treated later.

The frame 10 embodies a rectangular base 15 made up of a pair of horizontally arranged and longitudinally extending cylindrical members 16 and a pair of transverse I-beams 17 welded adjacent their ends to the ends of the members 16. The base 15 is supported above the ground by corner legs 18.

A pair of units 20 and 21, for supporting the cutter units 11, 12, respectively, are mounted on the base 15. Each supporting unit includes vertical spacer members 22 and a connecting horizontal channel 23. The channel 23 carries pairs of flanges 24 at its opposite ends. The flanges of each pair are adapted to slidably engage the opposite ends of the associated spacer member 22 and are adapted to be clamped thereto in vertically adjusted position by the bolt and slot connection 25.

For reasons that will later be explained, it is desired that the channels 23 and structure carried thereby be vertically adjustable relative to the base 15. The adjustment is accomplished by actuation of levelling screws 28 while connections 25 are in temporarily loosened condition.

The supporting unit 20 is fixed to the base 15 by welding the lower ends of its spacer members 22 to the upper surface of the transverse I-beam 17.

For reasons that will be explained, it is desirable that the longitudinal spacing of the supporting units 20 and 21 be adjustable. To this end, the supporting unit 21 further comprises a lower channel 31 welded to the lower ends of the spacer members 22 and at its opposite ends, as at 32, to a pair of semicylindrical shoes 33.

The shoes 33 ride on frame members 16 and thus slidably mount the supporting unit 21 in a manner whereby the position of said unit 21 may be adjusted longitudinally of the frame 10 to vary the spacing between cutter units 11 and 12. To maintain the supporting unit 21 in adjusted position, vertically slidable pins 34, carried by the shoes 33, may be entered in registering sockets 35 provided in the upper faces of the members 16.

As stated above, the detailed description of the cutter units will be confined to unit 11, since units 11 and 12 are similar. The chippers 7 and 8 are similar and are adapted to cut a notch or groove of given configuration, for instance, as here, a V-shaped groove.

The upper chipper 7 is keyed to, but axially adjustable with respect to, a shaft 37 which, in turn, is journalled in the bearing 38, as illustrated in FIGURE 4. Axial adjustment is accomplished after temporary removal of a bolt 39 by adding or removing washers 40. The bearing 38 is fixed to the lower edges of the channel 23 by bolting it to a mounting plate 41 fixed on the channel 23.

The lower chipper 8 is keyed to, but axially adjustable with respect to, a shaft 42 which, in turn, is journalled in a bearing 43. As in the case of the upper chipper, axial adjustment is accomplished by temporary bolt removal and adding or removing washers.

As illustrated in FIGURE 4, the effective cutting edges 44 and 45 of the chippers 7 and 8, respectively, are vertically spaced apart and aligned in a common vertical plane. In the illustrative embodiment, the shafts 37 and 42 are parallel. However, it will be understood that such a shaft orientation is not required provided the effective cutting edges 44 and 45 are oriented in the above specified manner.

The saw 9 is fixed on a shaft 48 which is journalled in a bearing 49. The bearing 49 is bolted to the associated I-beam 17 in a position spaced transversely from the vertically aligned chippers 7 and 8. As may be seen in FIGURE 4, the cutting plane of the saw 9 is parallel to the above-mentioned plane of the chipper edges 44 and 45. Further, as will hereinafter be explained in more detail, the saw 9 is located at a position perpendicularly offset from the plane of the chipper edges. That is, the saw 9 is located on the frame at a position toward the right, as illustrated in FIGURE 4. On the other hand, saw 9' is located toward the left of the associated effective chipper edges. The degree of offset in different cutting situations will be discussed later.

A pair of motors 50 and 51 and associated belt and pulley systems 52 and 53 are utilized for driving each of the cutter units 11 and 12. In connection with the cutter unit 11, the motor 50 is mounted on channel 23 of support unit 20 and is adapted, in cooperation with its pulley system 52, to drive the upper chipper 7 in the direction indicated by the arrow in FIGURE 1. The motor 51 is mounted on the I-beam 17 of unit 20 and drives the lower chipper 8 and saw 9 in the direction indicated (opposite that of chipper 7). A similar arrangement is provided for driving the chippers and saw of the cutter unit 12. However, it is to be noted that the saws and corresponding chippers of cutter units 11 and 12 rotate in the same directions, and therefore the corresponding motors here rotate in opposite directions.

The carriage 13 includes a pair of spaced apart and longitudinally extending base members 55 connected by a plurality of transversely extending base members 56. A horizontal work-supporting platform 58 is spaced above the base members by four vertical legs 57. In order that the work piece 14 may be conveniently moved longitudinally along the carriage-platform 58, the latter includes a plurality of longitudinally spaced rollers 59 adapted to make rolling contact with the lower surface of the work piece 14.

Two assemblies, 60 and 61, for releasably clamping the work piece relative to the carriage 13 are provided on the carriage at longitudinally spaced positions intermediate the supporting units 20 and 21. Each of the assemblies 60 and 61 embodies a pair of hollow vertical legs 62 fixed, one each, to the base members 55, at least during periods of operation of the machine. Telescopically received by the fixed legs 62 are a pair of vertically adjustable legs 63 maintained in a given position relative to the fixed legs 62 by means of a bolted connection 64. The legs 63 are interconnected at the upper ends by a horizontal work-engaging angle iron 65.

Each of the assemblies has a clamp 66 carried by the member 65 and adapted to releasably clamp the work piece 14 thereagainst. For illustrative purposes, the clamp 66 is here shown as of a simple, hand-operated type, it being in an engaged position in connection with the assembly 60 and in the released position in connection with the assembly 61. However, it is to be understood that the invention contemplates the use of any suitable clamp, operated either by power or by hand.

As may be seen in FIGURE 1, the assembly 61 is adapted for bolted connection to the base members 55, as at 67. Such a connection is desired so that the assembly 61 may be bolted in positions of adjustment longitudinally of the frame; the bolt holes 68 in the base members 55 being provided for that purpose. As will later be explained, the assembly 61 is preferably adjusted to a position relatively close to the supporting unit 21.

As noted above, the carriage 13 is adapted for rectilinear translation relative to the frame 10 along a direction line 69. This is accomplished by suspendnig the carriage 13 by means of a plurality of rollers 70, each of which engages one of the lower flanges 71 of the I-beams 17 and has an axis of rotation perpendicular to the direction line 69. The rollers 70 are mounted on the opposite ends of the base members 55 in opposed relationship to one another and are adapted to engage the webs 72 and flanges 71 of the associated I-beams 17.

Figure 8:
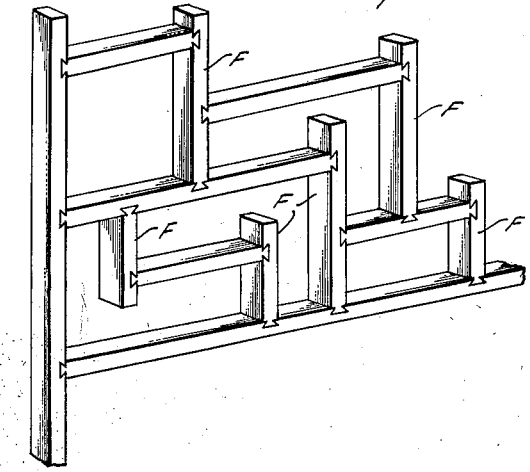
FIGURE 8 is a perspective view of a fence structure wherein certain of the elements are formed with only one terminal tenon each and are sized as to length in accordance with the invention.

With the above-described structure in mind, it is believed that the operation and certain fundamental operating principles of the machine can be best understood by following through an operational sequence. The sequence will first be described in connection with sizing the work piece 14 to a predetermined length defined by terminal tenons, the sizing and tenon-cutting being accomplished simultaneously, yielding shelving S, such as illustrated in the structure of FIGURE 7. On the other hand, the fence or lattice-like structure of FIGURE 8 does not demand that all elements be defined at both ends by tenons, as, for instance, vertical members F; and in this case only one chipper pair need be used, the other pair being temporarily idled, though the corresponding saw may still be used to size the elements F to predetermined lengths.

As a basis for the following description, it is desirable, first, to point out certain angular relationships and to identify certain structural characteristics of the desired, finished tenons. Referring to FIGURE 5, the finished tenon T may be seen to include V-shaped grooves 75 having vertical inner walls 76 and a slanting, outer wall 77. A vertical terminal surface 78 intersects the outer walls 77 and defines therewith the tips 79, each of an angular extent "a." A slant angle "b" is defined by each outer groove wall 77 and a terminal line perpendicular to the surface 78. It will be noted that the tip angle "a" and the slant "b" are complementary and, accordingly, an increase in one results in a corresponding decrease in the other.

It is first assumed that it is desired to cut tenons, as illustrated in FIGURE 5, wherein the thickness of the tenon at its outer end is equal to the thickness of the shelving S. In this case, the inner planes of the saws are flush with the outer planes of their associated chippers. That is to say, considering only the cutter unit 11, the cut made by the saw 9 will just intersect the cuts made by the chippers 7 and 8, but with no overlap of the chipping and sawing cuts lengthwise of the work piece 14. This is accomplished by appropriately adjusting the chippers longitudinally of their respective shafts in the manner previously explained.

It should also be noted that the saws of each of the cutter units are behind their associated chippers with reference to the direction line 69. Thus, the saws do not act at any time on an ungrooved portion or zone of the work piece 14. It will be appreciated that, depending upon the width of the work piece 14 with relation to the horizontal spacing of a saw and the associated chippers, sawing may or may not be taking place coincidentally with chipping. However, the sawing will always occur only within an already grooved zone of the work piece.

FIGURE 1 shows the various elements of the machine in their relative positions just prior to commencing a sequence of operation, it being understood that the clamp 66 on assembly 61 must be engaged against the work piece 14. The work piece 14 is illustrated as being a fresh piece of shelving stock, i.e., one on which no tenons have yet been cut. As shown in FIGURES 1 and 2, the work piece is clamped in such a position that the cutter units will perform as subsequently described. When so clamped, a small backup portion 80 of the work piece 14 (FIGURE 2) extends to the right of the cutter unit 11. The length of this backup portion 80 is preferably between ¼" and ½" or approximately equal to the width of the mouth of the intended groove. The reason for providing this backup portion will become clear as the description proceeds. In most situations, it is essential that a similar backup portion of the work piece 14 likewise extend to the left of the cutting unit 12. Since the work piece is here shown of a length considerably greater than that of the final product, this requirement is, of course, satisfied.

As the carriage 13 is moved in rectilinear translation, that is, along the direction line 69, the chipper pairs of each of the cutter units 11 and 12 cut, during a first period of operation, the V-shaped grooves 75 in the opposite surfaces of the work piece 14 in a manner shown in FIGURE 2. It will be appreciated that the grooves 75 are lined in a common vertical plane parallel to the direction line 69.

Continued transverse movement of the carriage 13 results in the saws of each cutter unit cutting through the work piece at a position just intersecting the slanting outer wall 77 of the grooves 75 in the manner illustrated in FIGURE 3. Since both cutter units 11 and 12 operate simultaneously, the operation yields the shelf board S' as shown in FIGURE 1, which is formed with terminal tenons and which is sized to a predetermined length. As previously mentioned, the inner planes of the saws are flush with the outer planes of their associated chippers and there is no overlap of the chipping and sawing cuts lengthwise of the work piece 14, resulting in a tenon of a tip-to-tip thickness equal to that of the final shelf board S'.

It is essential to note that it was mainly the cutting characteristic of chippers, acting predominantly during a period in which the tip was being finally shaped, that has heretofore caused the nicked or ragged edge effect of the tenon tips. In the case of the present machine, the tip 79 is not being finally formed during the period of chipping. Rather, this is a backup portion 80 of shelving stock located between the outer groove wall and the free end of the work piece 14 during such chipping, this backup portion being effective to preclude the otherwise prevailing tendency of nicking by chipper action.

On the other hand, the saws 9 make a clean cut and do not have the nicking characteristic of the chippers. Since it is the saws 9 that here are effective finally to form the tenon tips 79, no such nicking takes place.

Because the instant machine virtually eliminates the tendency for nicking or the ragged edge effect of the tenon tips, the tenon may conveniently be formed either with or against the grain of the work piece and with any desired tip angle "a."

Furthermore, it is possible to secure clean-cut tenons having tip and slant angles within a range which was throught impossible because of the previous nicking effect of chippers. For optimum strength and minimum pull-apart tendency, it has been found advantageous to use a tenon with a tip angle "a" of approximately 38° or conversely, a slant angle of approximately 52°. This angularity comes within a range thought impossible, but is completely possible of accomplishment with the present device. However, the specification of these angles is only for illustrative purposes and is not intended to be limitative on the claims.

Should it be desired for any reason to form a tenon having a tip-to-tip thickness less than that of the work piece, such as shown in FIGURE 4, it is necessary only to appropriately adjust the chippers of a given cutter unit relative to their associated saw in the direction of their axes of rotation. To obtain such a tenon, the cut made by the saw must overlap the cuts made by the chippers as opposed to the flush relationship of the respective cuts in the case of the full thickness tenon. As was previously explained with reference to FIGURE 4, such adjustment of chipper 7, for example, is accomplished by temporarily removing bolt 39 and adding or removing an appropriate number of washers 40.

The machine is adjustable to provide shelving or other products of different lengths. Such adjustment is accomplished by removing the pins 34 from their sockets 35 in the cylindrical member 16 and sliding the supporting unit 21 longitudinally of the frame 10 to any desired position. The pins 34, of course, then are inserted in the newly registering sockets 35 to maintain the supporting unit 21 in adjusted position. For a finer range of adjustment, the chippers and saws of a given cutter unit may be adjusted longitudinally of their respective shafts. In conjunction with this adjustment of the supporting unit 21, the clamp assembly 61 of the carriage should also be readjusted to a position wherein it is reasonably close to the cutter unit 12. As was mentioned above, such a spacing between the cutter unit 12 and the assembly 61 is desired in order to prevent chatter of the work piece 14 during the cutting operation.

The machine is also adapted to accommodate work pieces of various thicknesses. Assuming that it is desired to maintain a given depth of the tenon grooves 75, adjustment for thickness is accomplished in two steps. The first step involves loosening the bolt and slot connections 25 which retain the channels 23 of the supporting units 20 and 21 in adjusted position. The levelling screws 28 are then actuated to raise or lower the channels 23 and the upper chippers 7 and 7' carried thereby relative to the associated lower chippers and saws. The connections 25 are then retightened to complete the first step.

The second step comprises vertically adjusting the work-engaging members 65 on the assemblies 60 and 61 of the carriage a corresponding amount to position the work piece 14 relative to the chippers of a given cutter unit whereby a medial plane of the work piece is positioned intermediate the effective cutting edges 44 and 45. As was noted above, adjustment of the member 65 is effected by temporarily loosening the bolted connections 64. Thus, it will be appreciated from the foregoing that the machine provides a great deal of flexibility with regard to accommodating work pieces of various thicknesses and in the length and groove configuration of the final product.

From the above description, it will be seen that there is provided a novel method of cutting a terminal tenon involving first cutting vertically aligned V-shaped grooves in the opposite surfaces of the work piece at a location spaced inwardly from the free end thereof, and thereafter cutting said work piece in a vertical plane at a position intersecting the wall of the groove nearest said free end of the work piece.

It will be understood that the particular embodiment of my invention described herein is merely illustrative of one form of my invention, and that numerous changes in the construction and arrangement of the various parts may be made without departing from the spirit and scope of the invention as defined by the appended claims.

I claim:

1. A machine for forming a tenon on one end of a work piece, comprising: a frame; means for conveying the work piece in rectilinear translation across the frame; rotary chipper means on the frame adapted, during a first period of translation, to cut a groove of angular cross section across a surface of the work piece at a point spaced inwardly of said one end, the defining wall of said groove which is nearer said one end extending obliquely from said surface toward the other end of the work piece and being oriented at a slant angle of approximately 52°; and a saw on the frame adapted, during a subsequent period of translation, to cut off said one end of the work piece in a plane which intersects said groove-defining wall and is perpendicular with respect to said surface to provide a tenon with a tip angle of approximately 38°.

2. A machine for forming dovetail tenons on the ends of a work piece, comprising: a frame; means for conveying the work piece relative to said frame along a horizontal direction line; two pairs of rotary chippers mounted, one pair each, on opposite sides of the frame, each pair of said chippers being arranged to cut in the opposite horizontal surfaces of the work piece, V-shaped longitudinal grooves which are vertically aligned in a plane parallel to said direction line, with the inner wall of each groove substantially vertical and the outer wall slanting toward the end of the work piece at a slant angle of approximately 52°; and a pair of saws on said frame associated, one each, with each pair of chippers, each of said saws being behind its associated pair of chippers along said direction line and being arranged to cut said work piece after the cutting of the corresponding portions of the respective vertically aligned grooves in a vertical plane parallel to said direction line and intersecting the outer slanting walls of said last mentioned grooves to size said work piece and provide tenons on its ends with tip angles of approximately 38°.

3. A method of forming dovetail tenons on the ends of a flat work piece and simultaneously sizing the work piece to a predetermined length, including the steps of: moving said work piece along a direction line lying in a first plane; and in successive order during said moving, cutting in the opposite surfaces of said work piece two pairs of V-shaped longitudinal grooves, each of said pairs including substantially indentical grooves having corresponding inner walls aligned in a second plane which is parallel to said direction line and perpendicular to said first plane and corresponding outer walls which intersect said opposite surfaces of said work piece inwardly a predetermined distance from the end thereof and which are oriented at slant angles of approximately 52°, and cutting through said work piece in planes parallel to said second plane at positions intersecting said corresponding outer walls adjacent their intersection with said surfaces to form tenons with tip angles of approximately 38°.

4. A machine for forming a dovetail tenon on one end of a rectangular work piece, comprising: a frame; means for conveying the work piece in rectilinear translation across said frame; a pair of rotary chippers on said frame adapted, during a first period of translation, to cut a pair of substantially aligned grooves of angular cross sections across the opposite parallel surfaces of the work piece at locations spaced slightly inwardly of said one end, the defining wall of each of said grooves which is nearer said one end extending obliquely from the corresponding one of said surfaces toward the other end of said work piece and being oriented at a slant angle of approximately 52°; and a saw on the frame adapted, during a subsequent period of translation, to cut off said one end of the work piece in a plane which intersects the groove defining walls and is perpendicular with respect to said surfaces to provide a dovetail tenon with tip angles of approximately 38°.

5. A method of forming a dovetail tenon on one end of a work piece, including the steps of: cutting with chipper means elongated grooves of angular cross section across the opposite surfaces of said work piece at locations spaced inwardly of one end thereof, the defining wall of each of said grooves which is near said one end extending obliquely from said surface toward the other end of said work piece and being oriented at a slant angle of approximately 52° and, thereafter, cutting through said work piece in a plane which is parallel to said groove and which intersects said defining wall to provide a dovetail tenon with tip angles of approximately 38°.

References Cited in the file of this patent

UNITED STATES PATENTS

| 169,132 | Atwood | Oct. 26, 1875 |
| 395,526 | Totman | Jan. 1, 1889 |
| 1,923,853 | Van Duyn | Aug. 22, 1933 |
| 2,790,472 | Fata | Apr. 30, 1957 |

FOREIGN PATENTS

| 474,937 | Italy | Oct. 6, 1952 |
| 1,060,580 | Germany | July 2, 1959 |